US009347852B1

(12) United States Patent
DiMatteo (10) Patent No.: US 9,347,852 B1
(45) Date of Patent: May 24, 2016

(54) MICROSCOPE ILLUMINATION DIAGNOSTIC CUBE

(71) Applicant: Thomas DiMatteo, Mill Valley, CA (US)

(72) Inventor: Thomas DiMatteo, Mill Valley, CA (US)

( * ) Notice: Subject to any disclaimer, the term of this patent is extended or adjusted under 35 U.S.C. 154(b) by 137 days.

(21) Appl. No.: 14/271,036

(22) Filed: May 6, 2014

Related U.S. Application Data

(60) Provisional application No. 61/820,927, filed on May 8, 2013.

(51) Int. Cl.
*G01M 11/00* (2006.01)
*G02B 21/36* (2006.01)

(52) U.S. Cl.
CPC .............. *G01M 11/00* (2013.01); *G02B 21/361* (2013.01)

(58) Field of Classification Search
CPC .... G02B 5/04; G02B 26/0883; G02B 7/1805; G02B 27/09; G02B 27/0916; G02B 21/06; G02B 21/16; G02B 21/082; G02B 21/086; G02B 21/0032; G02B 21/002
USPC .................................. 359/368, 385–390, 837
See application file for complete search history.

(56) References Cited

U.S. PATENT DOCUMENTS

| | | | |
|---|---|---|---|
| 5,323,009 A | 6/1994 | Harris | |
| 5,841,577 A | 11/1998 | Wachman et al. | |
| 5,923,466 A | 7/1999 | Krause et al. | |
| 6,169,289 B1 | 1/2001 | White et al. | |
| 6,252,664 B1 | 6/2001 | Barbera-Guillem | |
| 6,414,805 B1 | 7/2002 | Reichman et al. | |
| 6,683,735 B2 | 1/2004 | Stuckey | |
| 7,193,775 B2 | 3/2007 | Olszak et al. | |
| 7,369,308 B2 | 5/2008 | Tsuruta et al. | |
| 7,502,164 B2 | 3/2009 | Lytle et al. | |
| 8,179,525 B2 | 5/2012 | Narayana et al. | |
| 8,314,931 B2 | 11/2012 | Christiansen et al. | |
| 8,559,103 B2 | 10/2013 | Hecker | |
| 2009/0284833 A1 | 11/2009 | Shimamoto | |
| 2011/0032609 A1 | 2/2011 | Stanley | |
| 2011/0235170 A1 | 9/2011 | Kawasaki | |
| 2011/0299070 A1* | 12/2011 | Christiansen | G01N 21/276 356/243.1 |

FOREIGN PATENT DOCUMENTS

| | | |
|---|---|---|
| EP | 0 339 061 B1 | 3/1995 |
| EP | 0 495 930 B1 | 4/1999 |
| EP | 0 883 829 B1 | 7/2002 |
| JP | EP 2 573 607 A2 | 3/2013 |

OTHER PUBLICATIONS

Understanding Conjugate Planes and Köhler Illumination by Davidson and Fellers.

* cited by examiner

*Primary Examiner* — Jennifer L. Doak
(74) *Attorney, Agent, or Firm* — Steven A. Nielsen; www.NielsenPatents.com (57) ABSTRACT

Modern implementations of Kohler illuminated epi illumination microscope systems provide state of the art performance in various scientific fields such as clinical practice and biological research. While modern microscope performance has increased by use of high performance components, modern microscopes now degrade over time and exhibit inconstant performance. New systems comprise new illumination cubes that replace existing components and contain optical components that provide users with a diagnostic image of the epi illumination.

20 Claims, 5 Drawing Sheets

MICROSCOPE ILLUMINATION DIAGNOSTIC CUBE

RELATED PATENT APPLICATION AND INCORPORATION BY REFERENCE

This is a utility application based upon U.S. patent application Ser. No. 61/820,927 filed on May 8, 2013. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic cited or referred to in this application.

BACKGROUND OF THE INVENTION (1) Field of the Invention

The invention generally relates to monitoring the performance of microscopes. More particularly, the invention relates to new structures for creating diagnostic images and diagnostic information to monitor changes in illumination that may degrade over time, overall microscope performance and other microscope properties (2) Description of the Related Art U.S. Pat. No. 8,314,931 Method and System for Standardizing Microscope Instruments by Christiansen et al, issued on Nov. 20, 2012, describes a reflective calibration surface at the bottom of a modified microscope fluorescence filter cube. The system of the '931 Patent reflects the light emitted from the dichroic mirror back into the cube to be viewed by the microscope image acquisition system. While the Christiansen system does provide information regarding light intensity, the resulting diffusion from this technique obscures important detail.

Microscopes are well known in the prior art. The current state of the art in clinical practice and biological research favors epi illumination microscopy wherein an object is illuminated though the same objective being used to image or view that object. Most applications of epi illumination involve at least two optical axes, one for illumination and one for observation. When multiple optical axes are involved, a reflecting device such as a mirror, beam splitter, or fluorescence filter cube is used at the junction of these axes to appropriately join the axes together. The strategic location of this optical axes junction provides the opportunity for the replacement of these junction components with a newly designed diagnostic cube that will directly relay a diagnostic image of the epi illumination transmitting through one optical axis to an observation device, such as a camera or binocular in the added optical axis. The viewed object may be illuminated by various light sources that are often diffused, obfuscated, filtered and otherwise modified resulting in a diminished or uneven illumination of the object.

To facilitate standardized or accurate observations of an objects, the illumination of a microscope must remain uniform and consistent to avoid misinformation. While the prior art provides useful illumination via the Kohler illuminated epi illumination system as described below, the prior art fails to comprehensively address the source of the performance declines of modern microscopes.

Modern microscopes are often illuminated with several components that may be responsible for illumination performance problems. These components may include but are not limited to LEDs, lasers, light bulbs, fiber optic cables, liquid light guides, liquid light guide couplers, as well as beam steering and beam focusing optics. Such problems may be non-linear, temporal, subtle or dramatic even to a trained professional, revealing profound shortfalls with the prior art.

The overall benefits of the prior art epi illumination light path are widely utilized in the microscope industry, but the design is flawed with respect to monitoring changes in performance of modern microscopes. For example, the conjugate planes described in a Kohler epi illumination system, demonstrate the visibility of the epi illuminated light source in the aperture or illumination planes of the microscope. State of the art techniques that are built into a microscope for measuring the performance of an epi illuminated light source do not address the light source as seen in the illumination plane and therefore lack the ability to detect significant misalignments or changes that may occur with the illumination source components.

While the prior art of Kohler epi illumination is inherently flawed in the area of detecting changes in illumination, light sources (often used in Kohler systems) are especially prone to performance declines. Moreover, other components, which include laser combiners, fiber optics cables, fiber optic couplers, liquid light guides and liquid light guide couplers also underperform or degrade with handling and use over time. Fiber optic cables, coupler interfaces, liquid light guides and liquid light guide couplers are easily compromised. Alignment issues also will affect a microscope's performance. If a bulb is misaligned or a liquid light guide is not properly positioned, the performance of a fluorescence microscope will be degraded. If the fiber optic cable of a laser based illumination source is compromised, that laser based microscope will underperform. Unintended obstructions to a light source will compromise the performance of microscope and are difficult to diagnose if the user is unable to see and monitor performance.

BRIEF SUMMARY OF THE INVENTION

The present invention overcomes shortfalls in the related art by presenting an unobvious and unique combination, configuration and use of new diagnostic tools that convey critical diagnostic and performance information. Disclosed embodiments include a new diagnostic cube system that may be fitted into a microscope fluorescence filter cube turret, slider or magazine. Additionally the new diagnostic cube may be optimized to perform in beamsplitter devices such as a trinocular head, quadrocular head or image relay turret. Disclosed diagnostic cube systems obtain and report critical diagnostic image information such as a microscope's illumination system(s). Disclosed systems overcome shortfalls in the art by use of unique locations using either modified fluorescence filter cubes or newly designed diagnostic optics cubes. A diagnostic image is provided either directly to the user or through the microscope's image acquisition system, thus improving the analytical capabilities of a microscope system.

Disclosed embodiments include cube systems that may be retrofitted into existing microscope systems and other systems requiring a new construction.

Disclosed embodiments overcome shortfalls in the art by seamlessly integrating with the current art epi illuminated microscopes. Disclosed embodiments may include new cube systems or filter cubes to execute an epi illuminated system and to overcome the shortfalls in the art by providing diagnostic reporting. To better understand the seamless integration of disclosed embodiments into epi illuminated microscopes, an overview of the art is helpful and is given below.

Standard Fluorescence Filter Cube Defined

Most epi illuminated microscopes use at least two optical axes. One axis is often the illumination axis, comprising a light source, one or more components that connect the light source to the microscope, internal relay optics, which are usually internal to the microscope body and finally the fluorescence filter cube. The second optical axis is often the observation axis, which is orthogonal (at a right angle or perpendicular) to the illumination axis. A fluorescence filter cube may be comprised of a metal and/or plastic device, containing optical components. The current fluorescence filter cube design utilizes spectral filters to separate image information trafficking through the focal point of the filter. The fluorescence filter cube is a device that is capable of joining the two optical axis together. The fluorescence filter cube may also be used to join an additional illumination axis components or additional observational axis components to a microscope as there may be several optical axis in a modern microscope.

A fluorescence filter cube is designed to house and position a fluorescence filter cube's three commonly used optical components, an excitation filter, a dichroic mirror and an emission filter. A fluorescence filter cube contains mounting surfaces for each of those components. The fluorescence filter cube includes two openings in the observation axis, one oriented towards the objective and is open. The second oriented towards the binocular and/or detector and has an emission filter. Light from the epi light source passes through the excitation filter opening in the illumination axis and is reflected by the dichroic mirror, through the opening in the fluorescence filter cube that is directed to the objective. That light passes through the objective and on to the specimen which reflects fluorescing light from the specimen. This fluorescence reflection then passes back through the objective along the observation axis, through the dichroic mirror and emission filter and on to the binocular or microscope image acquisition system.

Disclosed Diagnostic Cubes and Other Disclosed Systems

Disclosed embodiments overcome shortfalls in the art by eschewing prior art configurations of fluorescence filter cubes and by creating entirely new diagnostic tools that relay critical diagnostic information available at unique locations to a user or image acquisition system. Disclosed diagnostic cubes provide a diagnostic image of the incident light from either the epi fluorescence light source located in the illumination axis or the incident light from an illumination device, such as a confocal attachment, located in the observation axis of a microscope. The diagnostic image provides critical performance information regarding the illumination system. Users may establish a baseline of performance with which to compare over time or compare with similarly equipped microscopes.

Two techniques are described that capture and convey microscope data to the user. A first method optically sends a diagnostic image to the user or an image acquisition system. A second method utilizes a built in miniature wireless ccd camera and optics to send a diagnostic image to the user. Disclosed diagnostic tools can either be housed in a fluorescence filter cube holder or housed in a newly designed diagnostic optics cube. The newly designed diagnostic cube can be mounted in the place of a photo port beamsplitting device such as the prism assembly of a trinocular or quadrocular head of a microscope or prism turret of an inverted microscope. The newly designed diagnostic cube can also be mounted in a fluorescence filter turret using the external form of a fluorescence filter cube that maintains the key external design elements of the fluorescence filter cube, enabling the newly designed cube to fit into a microscope in the same way a fluorescence filter cube will. The new cube has interior and exterior spaces that facilitate the many optical element options required to properly convey the image of the light source to an observation port, without the limitations of a photo beamsplitter prisim or fluorescence filter cube that were designed for a different purpose.

In the new diagnostic tool configurations that follow, illumination and observation axis optics will refer to optical components mounted in the identified optical axis that appropriately modify the observed illumination in order to best facilitate the configuration of the microscope being monitored. These components may comprise positive lens elements, negative lens elements, pinholes or pinhole disks, neutral density filters and spectral filters. The configuration of the microscope illumination system and the observation method being used, determine which element is used in each axis. Some of these configurations can be housed in an existing fluorescence filter cube; however, it is often simpler and less expensive to use a newly designed diagnostic optics cube, to house the required components. When a standard fluorescence filter cube is being used without a miniature wireless ccd camera, an orthogonal mirror frame is required to properly position an orthogonal mirror, which reverses the direction of the incident illumination, pointing it directly towards the binocular or image acquisition system. When a newly designed diagnostic optics cube is used, spaces for properly oriented components such as an orthogonal mirror, illumination axis optics and or observation axis optics are provided. A miniature wireless ccd camera can also be used in conjunction with either of the optical axis components. Since only one of the optical axis is observed, there is no requirement for an orthogonal mirror, orthogonal mirror frame or second axis optical components.

REFERENCE NUMERALS IN THE DRAWINGS 1 light source within a reflected light type microscope, sometimes referred to herein as an epi light source
2 a first location of the conjugate plane referred to as the illumination plane or the aperture plane, in the epi illuminated light path
3 a second location of the conjugate plane in an epi illuminated light path
4 a third location of the conjugate plane in an epi illuminated light path
5 a fourth location of the conjugate plane in an epi illuminated light path
6 collimating lens used in an epi illuminated light path
7 collimating lens used in an epi illuminated light path
8 tube lens
9 aperture diaphragm used in an epi illuminated light path
10 field diaphragm used in an epi illuminated light path 11 microscope objective
12 fluorescent sample
13 microscope binocular, multi-ocular, photo port devices, image acquisition systems, confocal devices or other illumination
14 excitation filter
15 dichroic mirror
16 emission filter
20 reflected light type fluorescence filter cube
21 first opening in a fluorescence filter cube
22 second opening in a fluorescence filter cube
23 reflecting surface
24 an illumination axis
25 an observation axis
26 bottom void in a fluorescence filter cube sometimes used as a path for excitation and emission light
27 a first illumination axis optical component, such as a neutral density filter
28 a second illumination axis optical component, such as a concave lens
29 a third illumination axis optical component, such as a pin hole
31 a first observation axis optical component, such as a convex lens
32 a second observation axis optical component
33 a third observation axis optical component
34 orthogonal mirror frame
36 mirror fitted to orthogonal mirror frame 34
40 newly designed diagnostic optics cube
41 newly designed diagnostic optics cube containing miniature wireless ccd oriented to monitor microscope epi illumination
42 orthogonal mirror mounted in newly designed diagnostic optics cube 40
43 a first mirror positioning set screw
44 a second mirror positioning set screw
45 a third mirror positioning set screw
46 a fourth mirror positioning set screw
47 neutral density filter
50 dichroic mirror wheel
51 mirror mounted into an orthogonal mirror frame 52
52 orthogonal mirror frame, fitted to a dichroic mirror wheel
53 excitation or emission filter wheel
54 excitation filter fitted to excitation filter wheel or emission filter fitted to emission filter wheel
55 illumination axis optics fitted to an excitation filter wheel or observation axis optics fitted to an emission filter wheel
56 miniature wireless ccd camera
57 a newly designed diagnostic optics cube containing miniature wireless ccd oriented to monitor illumination from the photo port of the microscope
100 a modified reflected light type fluorescence filter cube
110 a first side of a cube, sometimes used to define a first void 21
120 a second side of cube, sometimes used to define a second void 22
130 a third side of cube, perpendicular to the first side 110,
150 an unused void defined within a third side 130 of a cube 100

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

Figure 1:
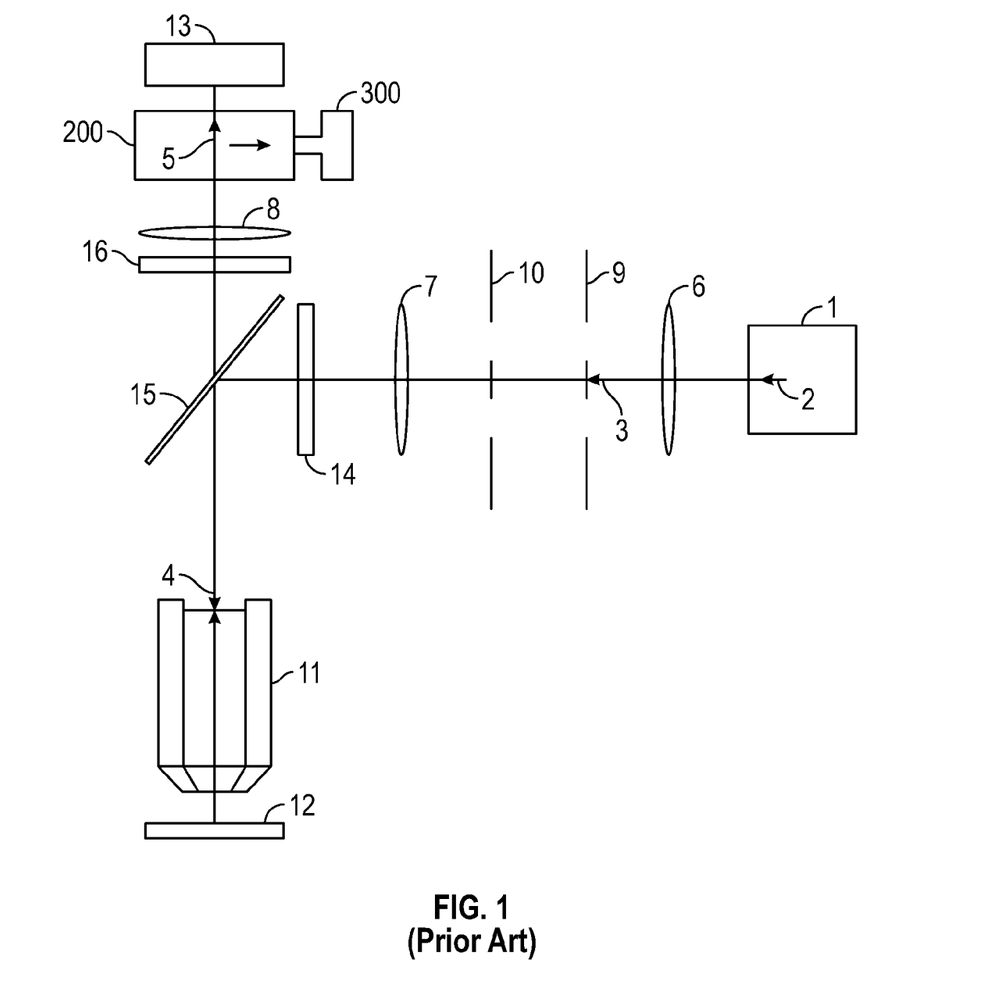
FIG. 1 depicts a prior art system implementing Kohler microscope

FIG. 1 depicts a simple ray diagram of the optical path and components of a basic Kohler illuminated reflected light type fluorescence microscope. The four locations, 2, 3, 4, 5 where the conjugate illumination planes are located, in this path are identified. Also depicted are the locations of the light source 1, the objective 11, the specimen 12, the fluorescence filter cubes' excitation filter 14, the fluorescence filter cube's dichroic mirror 15, the fluorescence filter cube's emission filter 16, the tube lens 8 and the microscope binocular or image acquisition system 13. The term light source, is inclusive of the many light source components, such as but not limited to, a liquid light guide, a light guide coupler, a collector lens, a fiber optic cable and fiber optic coupler. The collimating lenses 6, 7 used in a Kohler illumination system, to relay the illumination in the microscope are also shown.

Figure 2:
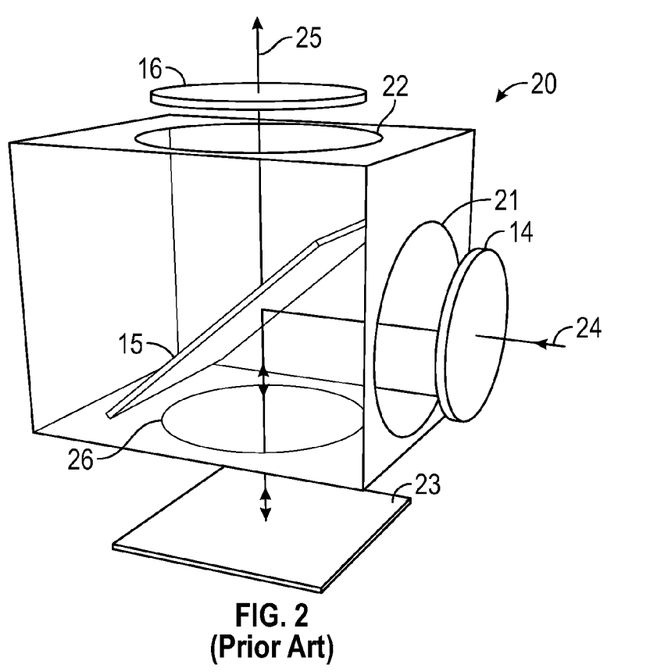
FIG. 2 depicts a prior art system of U.S. Pat. No. 8,314,931

FIG. 2 depicts various optical components of the prior art disclosed in U.S. Pat. No. 8,314,931 which discloses a basic reflected light type fluorescence filter cube 20, and a reflecting surface 23. Two optical axes are shown, the illumination axis 24 and the observation axis 25. Light from the epi illuminator, after it is manipulated by the optics of the microscope is shown incident on excitation filter 14, which is mounted in a first opening 21 of the fluorescence filter cube 20. Filtered light is then reflected off a dichroic mirror 15, and passes through a bottom void 26 and is shown incident on a standardized reflecting surface 23.

Fluorescing light reflected from the reflecting surface 23 then passes though the bottom void 26 again, then through a dichroic mirror 15 and is then incident on an emission filter 16, located in a second opening 22 of the fluorescence filter cube. This prior art calibration provides a simple intensity measurement of the light coming from the light source, but will sufficiently scramble the light such that an image of the light source as seen in the illumination plane=is lost. This prior art short fall masks bulb alignment issues, liquid light guide performance and placement issues and any other significant problems related to the performance of the primary illumination. By design, Kohler illumination masks these issues sufficiently to distribute the light more evenly in the sample plane; however, the efficiency of such illumination distribution will not prevent the significant performance declines resulting from epi illumination problems and in most cases will just obscure detection of such derogations. Thus, the current shortfalls in the art are manifest.

The best way to monitor the performance of the light source in a Kohler illuminated light path, is to have access to an image of the illumination plane of that light source. There may be optical solutions that provide this access; however; such prior art systems do not involve a device located in the fluorescence filter cube position, or in the trinocular, quadrocular, prism turret locations as disclosed herein.

Figure 3:
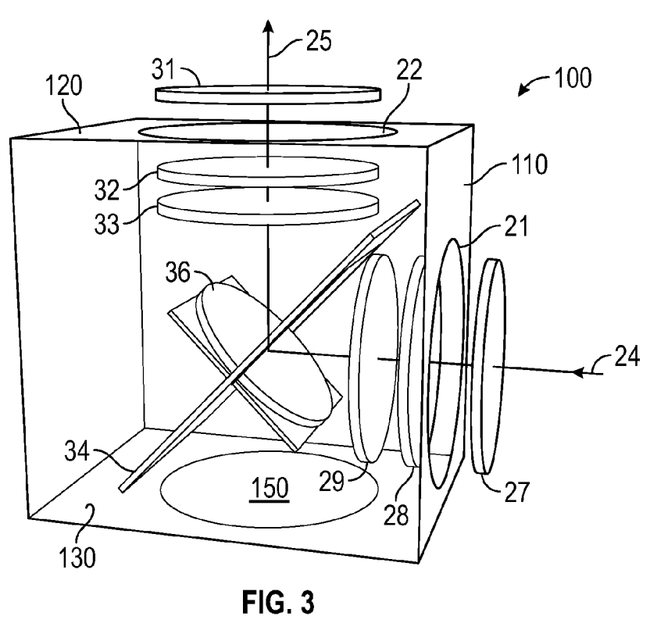
FIG. 3 depicts a disclosed embodiment

FIG. 3 depicts a disclosed embodiment comprising a modified fluorescence filter cube 100, wherein a first side 110 defines a first opening 21, which in the prior art would hold an excitation filter 14, but instead, in the disclosed embodiments will contain one or several illumination axis optical components 27, 28, 29. A second side 120 may define a second void 22, in the prior art, the second void would hold an emission filter 16, but instead, in the disclosed embodiments the second void 22 will contain one or several observation axis optical components 31, 32, 33. The dichroic mirror 15 of the prior art is replaced by an orthogonal mirror frame 34, to which the orthogonal mirror 36 is attached. The orthogonal mirror 36 is positioned within the fluorescence filter cube 100, by the mirror frame 34, such that it will reflect the incident illumination from the illumination axis 24 directly into the observation axis 25, towards the binocular or microscope image acquisition system. This 90 degrees difference in mirror orientation from a traditionally placed or prior art dichroic mirror 15 yields a 180 degree shift in light direction, so the light from the epi light path is reflected away from the objective and towards the binocular or microscope image acquisition system. Based upon the substitution of components described herein, the prior art is shown to teach away from the presently disclosed embodiments.

This disclosed embodiments provide a quality view of the illumination plane, may be obtained using the attributes of the illumination axis optics 27, 28, 29 and observation axis optics 21, 32, 33. The illumination and observation optics may include a pinhole for extending depth of field, positive and negative lens elements that change the magnification and focus of the conjugate image to best adapt to the many different microscope/camera configurations.

Neutral density filters and wavelength filters may also be required to facilitate safe illumination levels. The choice of where each optical lens component is located is determined by the host microscope optics, including the microscope image acquisition system field of view, which is often a combination of the camera sensor size, =the magnification of the microscope camera adapter and the size of the illumination source. In one example of this configuration, component 27 is a neutral density filter, 28 is a concave lens, 29 is a pin hole, 31 is a convex lens and 32 and 33 are empty. This disclosed embodiment relays an image of the illuminator that is sized to fit microscope image acquisition system 13 configurations that are currently used in many fluorescent microscopes. In another configuration, component 27 is a neutral density filter, 33 is a pinhole and the others are empty. This embodiment relays a larger image that is sized to work with larger format cameras and show implemented in a standard fluorescence filter cube.

Figure 4:
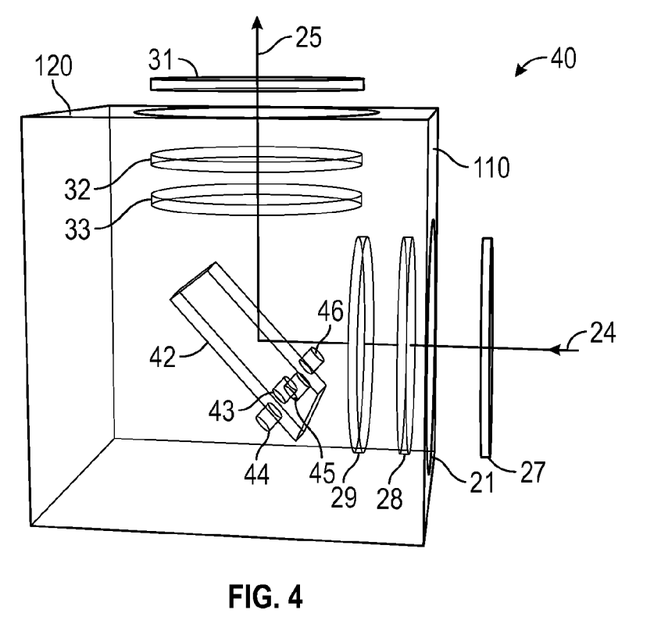
FIG. 4 depicts a disclosed embodiment

FIG. 4 depicts a disclosed embodiment where a newly designed diagnostic optics cube 40 replaces a traditional fluorescence filter cube, such as cube 20 of FIG. 2. The diagnostic optics cube 40 maintains the key external design elements of a traditional fluorescence filter cube, enabling the diagnostic optics cube 40 to fit into a microscope in similar fashion to a traditional fluorescence cube. But, the disclosed diagnostic optics cube 40 has interior and exterior spaces that facilitate the many optical element options required to properly convey the image of the epi light source 1, to the observation port without the limitations of a traditional fluorescence filter cube 20, which was designed for a different purpose.

The disclosed diagnostic optics cube is in direct contradiction to the prior art. For example, the disclosed diagnostic optics cube 40 comprises a mirror 42, having an orientation perpendicular to the orientation of the dichroic mirror 15 found in the prior art fluorescence filter cube 20. The difference in mirror orientation from a traditionally placed dichroic mirror 15, yields a 180 degree shift in light direction, so the light from the epi light path 24 is reflected away from the objective and towards the binocular or microscope image acquisition system 13, providing a quality view of the illumination plane, obtained using the attributes of the illumination axis optics 27, 28, 29 and observation axis optics 31, 32, 33.

Disclosed optics include a pinhole for extending depth of field, positive and negative lens elements that change the magnification and focus the conjugate image to best adapt to the many different microscope/camera configurations. Neutral density filters and wavelength filters may also be required to facilitate safe illumination levels. The choice of where each optical lens component is located is determined by the host microscope optics, including the microscope image acquisition system field of view, which is often a combination of the camera chip size, the magnification of the microscope camera adapter and the size of the illumination source.

In one example of this configuration, component 27 is a neutral density filter, 28 is a concave lens, 29 is a pin hole, 31 is a convex lens and 32 and 33 are empty. This configuration of the invention relays an image of the illuminator that is sized to fit microscope image acquisition system configurations that are currently used in many fluorescent microscopes. In another embodiment, component 27 is a neutral density filter, 33 is a pinhole and the others are empty. This configuration of the invention relays a larger image that is sized to work with larger format cameras and is shown implemented in this newly designed diagnostic optics cube 40.

This embodiment of the invention functions in the same manner as the embodiment of the invention shown in FIG. 3, however the disclosed diagnostic optics cube 40 is simpler and more cost effective to create more spaces and features in a new construction as compared to the to retrofit a fluorescence filter cube 100, designed to house a standard dichroic mirror 15, excitation filter 14 and emission filter 16.

Added features such as the mirror adjustment set screws 43, 44, 45, 46 or a miniature wireless ccd camera, are also easier to implement in a newly designed diagnostic optics cube 40 verses modifying an existing fluorescence filter cube. In another embodiment, component 27 is a neutral density filter, component 31 is a neutral density filter and comprises an orthogonal mirror. This configuration can be used for laser based applications such as described in FIG. 5, however the newly designed diagnostic optics cube 40, is used instead of a modified fluorescence filter cube 100.

Figure 5:
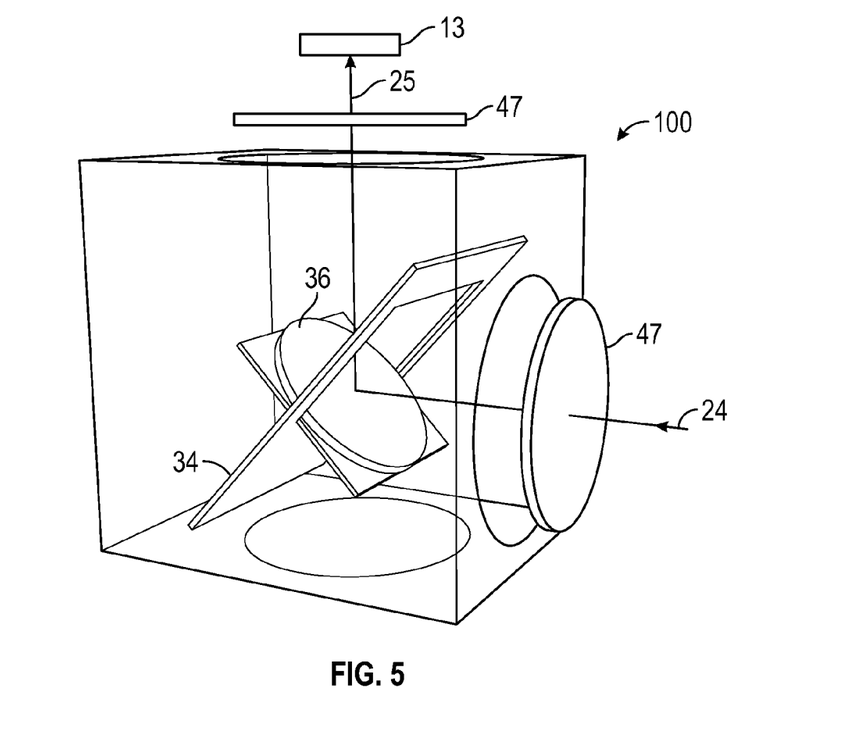
FIG. 5 depicts a disclosed embodiment

FIG. 5 depicts a disclosed embodiment wherein the configuration shown in FIG. 3, is simplified with the use of a neutral density filter 47 in each of the optical axis 24, 25. Neutral density filters 47 are configured to compensate for the various laser intensities provided. This can be useful as a positioning and focus aid for lasers. The ability to repeatedly position a laser can be critical to obtaining consistent results from a microscope. This embodiment is helpful for verifying laser orientation and focus, without directly exposing the sample or user to laser radiation.

Figure 6:
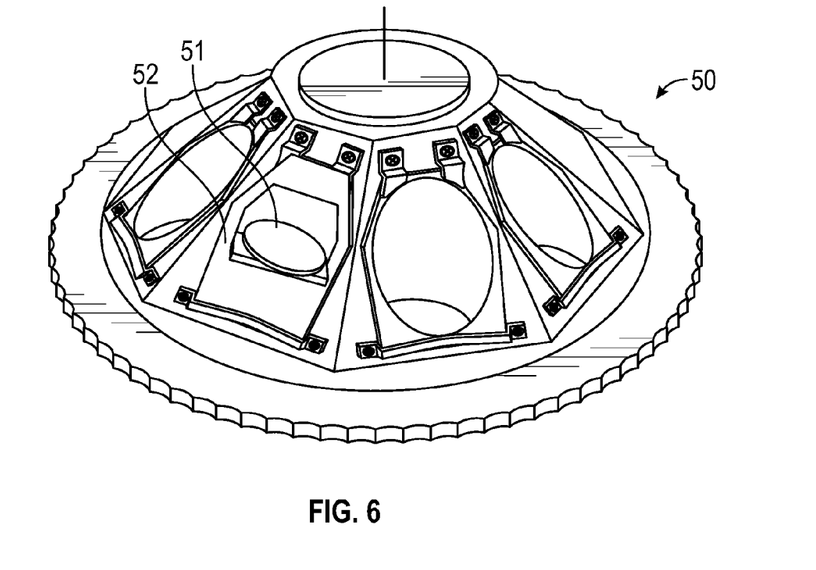
FIG. 6 depicts a perspective view of a dichroic mirror wheel

FIG. 6 depicts a dichroic mirror wheel 50 comprised of a mirror 51 mounted upon or into an orthogonal mirror frame 52.

Figure 7:
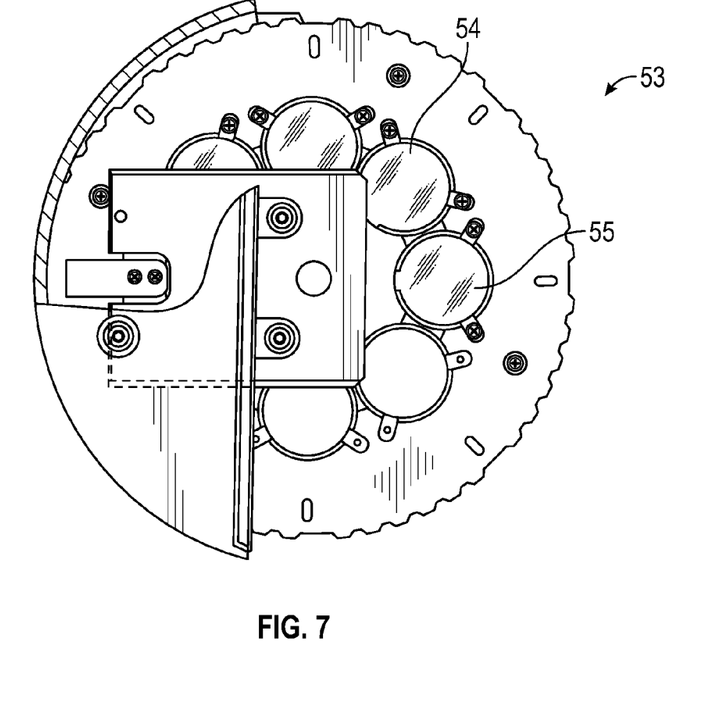
FIG. 7 depicts a perspective view of a excitation or emission filter wheel

FIG. 7 depicts an excitation or emission filter wheel 53 comprising an excitation filter 54 and illumination axis optics 55.

Disclosed embodiments include configurations wherein the illumination axis optics 27, 28, 29, observation axis optics 31, 32, 33 and orthogonal mirror 36 are placed in components other than a fluorescence filter cube 20. These devices such as excitation or emission filter wheels 53, dichroic mirror wheels 50, multi-spectral light sources, lasers, and beam splitter prisms contain options that are relevant to other design criteria and can be used to house the optics required to relay the diagnostic image from an illumination axis to an observation axis when the space for a fluorescence filter cube is not available.

These devices can still be adapted to utilize the critical components of this invention in the context of their own design. The dichroic mirror wheel 50 and it's associated emission filter wheel 53, cited in U.S. Pat. No. 6,414,805, are an example of how one skilled in the art of optics can configure these devices to perform the diagnostic function of this invention outside of a traditional fluorescence filter cube configuration. In this case, a dichroic filter 15 placed in a dichroic filter wheel 50, would be replaced by a mirror 51 sized and mounted in a modified orthogonal mirror frame 52 and the excitation or emission filter 54 is replaced with illumination axis optics 27, 28, 29 and or observation axis optics 31, 32, 33, as called for by the application.

Figure 8:
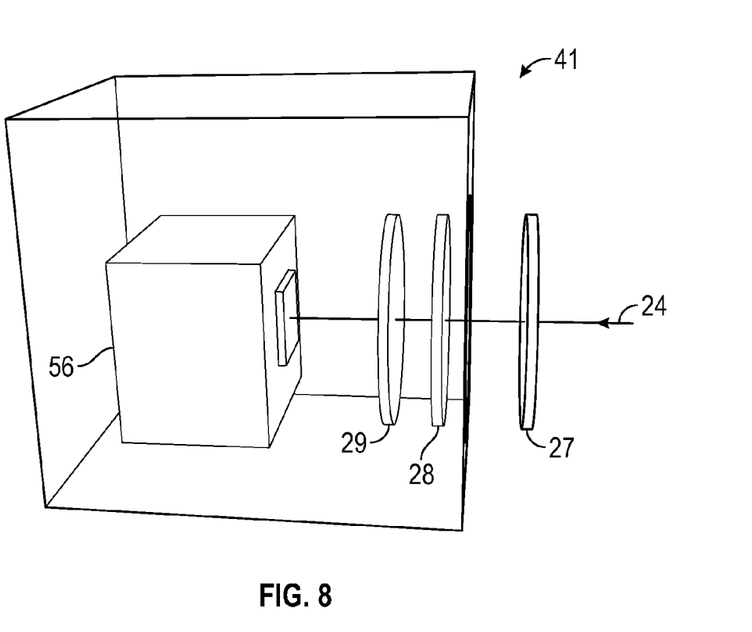
FIG. 8 depicts a disclosed embodiment

FIG. 8 depicts a disclosed embodiment wherein a miniature wireless ccd camera 56, placed in either a conventional reflected light type microscope fluorescence filter cube holder or a newly designed diagnostic optics cube 41, replaces the orthogonal mirror 42 as well as the observation axis optics, 31, 32, 33. In this embodiment, the miniature wireless ccd camera 56 replaces the function of these components by providing a direct access to the image of the illuminator as composed by the optics of the illumination axis optics 27, 28, 29.

These optics may contain a pinhole when the illumination source is being used for wide field or laser illumination, however there may be applications when the pinhole is not used. Other illumination optical components may include positive and or negative lens for size manipulation, neutral density filters for intensity modification and wavelength filters for spectral discrimination. This configuration is also useful for laser applications such as TIRF. The neutral density filter configuration in the illumination axis optics 27, 28, 29 is modified to reduce the laser intensity so the miniature wireless ccd camera 56 can record its position, to be used as a reference. An added benefit of this configuration is an added level of safety by virtue of reducing the risk of a user accidentally exposing themselves to laser radiation.

Figure 9:
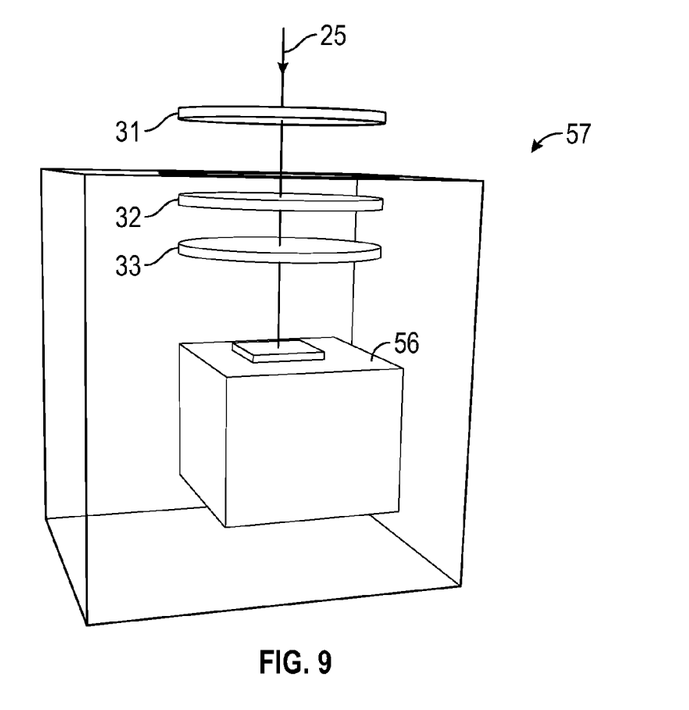
FIG. 9 depicts a disclosed embodiment

FIG. 9 depicts a disclosed embodiment wherein a miniature wireless ccd camera 56, placed in either a conventional reflected light type microscope fluorescence filter cube holder or a newly designed diagnostic optics cube 57, replacing the orthogonal mirror 42 as well as the illumination axis optics, 27, 28, 29. In this embodiment, the miniature wireless ccd camera 56 replaces the function of these components by providing a direct access to the image of the illumination incident from a photo port of a microscope. The observation axis components 31, 32, 33 may include positive and or negative lens for size manipulation, pinhole for extended depth of field, neutral density filters for intensity modification and wavelength filters for spectral discrimination.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments include the following items:

Item 1. A diagnostic optics cube for sampling the illumination of an epi illumination light source of a microscope, the diagnostic optics cube comprising:

a) at least six sides and an interior;

b) a first side 110 defining a first void 21 with the first void containing a first illumination axis optical component 27;

c) a second side 120 defining a second void 22 with the second void containing a first observation axis optical component 31;

d) a mirror 42 fastened within the interior of the diagnostic optics cube, the mirror positioned to orthogonally relay the incident illumination between the first 110 and second 120 voids; and e) an illumination axis entering though the first void and an observation axis exiting though the second void.

Item 2. The diagnostic optics cube of item 1 wherein the diagnostic optics cube replaces a beamsplitter in a microscope.

Item 3. The diagnostic optics cube of item 1 wherein the diagnostic optics cube replaces a fluorescence filter cube in a microscope.

Item 4. The diagnostic optics cube of item 1 wherein the mirror comprises a plurality of set screws;

Item 5. The diagnostic optics cube of item 1 further comprising a plurality of observation axis optical components fastened between the mirror and the second void.

Item 6. The diagnostic optics cube of item 1 further comprising a plurality of illumination axis optical components fastened between the mirror and the first void.

Item 7. The diagnostic optics cube of item 5 wherein one or more of the observational axis components are selected from the group comprising, convex lens, concave lens, achromatic lens, pinhole and optical filters, where that selection is determined by the optical configuration of both the illumination and observation axis optics in the microscope body that host the diagnostic cube, with those choices optimized for the expressed purpose of providing a clear focused image of the light source being observed to the image sensor or binocular.

Item 8. The diagnostic cube of item 6 wherein one or more of the illumination axis optical components are selected from the group comprising, convex lens, concave lens, achromatic lens, pinhole and optical filters, where that selection is determined by the optical configuration of both the illumination and observation axis optics in the microscope body that host the diagnostic cube, with those choices optimized for the expressed purpose of providing a clear focused image of the light source being observed to the image sensor or binocular.

Item 9. The fluorescence filter cube of item 8 wherein the first illumination axis component is a neutral density filter having a reflective outer side and a non-reflective inner side, the neutral density filter aligned to the first void.

Item 10. A fluorescence filter cube for sampling the illumination of an epi illumination light source of a microscope, the fluorescence filter cube comprising:
  a) at least six sides and an interior;
  b) a first side defining a first void with the first void containing a first illumination axis optical component;
  c) a second side defining a second void with the second void containing a first observation axis optical component;
  d) the interior of the fluorescence filter cube containing a mirror fitted an orthogonal mirror frame positioned to orthogonally relay the incident illumination between the first and second voids; and
  e) an illumination axis entering though the first void and an observation axis exiting though the second void.

Item 11. The fluorescence filter cube of item 10 further comprising a plurality of observation axis optical components fastened between the mirror and the second void.

Item 12. The diagnostic cube of item 10 further comprising a plurality of illumination axis optical components fastened between the mirror and the first void.

Item 13. The fluorescence filter cube of item 11 wherein one or more of the observational axis optical components are selected from the group comprising, convex lens, concave lens, achromatic lens, pinhole and optical filters where that selection is determined by the optical configuration of both the illumination and observation axis optics in the microscope body that host the diagnostic cube, with those choices optimized for the expressed purpose of providing a clear focused image of the light source being observed to the image sensor or binocular.

Item 14. The fluorescence filter cube of item 12 wherein one or more of the illumination axis optical components are selected from the group comprising: convex lens, concave lens, achromatic lens, pinhole and optical filters, where that selection is determined by the optical configuration of both the illumination and observation axis optics in the microscope body that host the diagnostic cube, with those choices optimized for the expressed purpose of providing a clear focused image of the light source being observed to the image sensor or binocular.

Item 15. The fluorescence filter cube of item 14 wherein the first illumination axis component is a neutral density filter having a reflective outer side and a non-reflective inner side, the neutral density filter aligned to the first void.

Item 16. A diagnostic optics cube containing miniature wireless ccd oriented to monitor microscope epi illumination, the diagnostic optics cube comprising:
  a) at least six sides and an interior;
  b) a first side with the first side defining a first void and the first void in alignment with one or more illumination axis optical components;
  c) the interior containing a ccd camera orientated to monitor microscope epi illumination; and
  d) an illumination axis entering though the first void.

Item 17. The diagnostic optics cube of item 16 wherein the diagnostic optics cube replaces a beamsplitter in a microscope.

Item 18. The diagnostic optics cube of item 16 wherein the diagnostic optics cube replaces a fluorescence filter cube in a microscope.

Item 19. The fluorescence filter cube of item 16 further comprising a plurality of illumination axis optical components fastened between the ccd and the first void.

Item 20. The diagnostic optics cube of item 19 wherein the one or more of the illumination axis optical components are selected from the group comprising: convex lens, concave lens, achromatic lens, pinhole and optical filters, where that selection is determined by the optical configuration of the illumination axis optics in the microscope body that host the diagnostic cube, with those choices optimized for the expressed purpose of providing a clear focused image of the light source being observed.

What is claimed is:

1. A diagnostic optics cube that relays an image of an epi illumination light source of a microscope, the diagnostic optics cube comprising:
  a) at least six exterior sides that enable the diagnostic cube to take an external form of a fluorescence filter cube or beam splitter;
  b) a first exterior side defining a first void with the first void containing illumination axis optical components comprising optical filters for selectively reducing incident illumination intensity, a lens that contributes to the reduction in the size of the diagnostic image and a pinhole that extends the depth of field of the relayed diagnostic image so all of the components in the epi illumination path of the microscope are included in the diagnostic image;
  when the illumination axis and observation axis share the same light path, a wireless digital camera relays the diagnostic image from the illumination axis components directly to a user;
  c) a second side defining a second void with the second void containing a first observation axis optical component;
  d) when the illumination axis and the observation axis are orthogonal, a mirror fastened within the interior of the diagnostic optics cube, is positioned to directly relay the modified incident illumination from the illumination axis into the observation axis, through the observation axis components and finally through the second void resulting in a resized focused diagnostic image relayed to the microscope binocular or camera; to the microscope binocular or camera; and
  e) when the illumination axis entering though the first void is reflected into an observation axis exiting though the second void to the microscope binocular or camera, the observation axis contains components comprising a lens for resizing and focusing the diagnostic image and an optional optical filter used to further selectively reduce the illumination intensity to the microscope binocular or camera.

2. The diagnostic optics cube of claim 1 wherein the diagnostic optics cube replaces a beamsplitter in a microscope.

3. The diagnostic optics cube of claim 1 wherein the diagnostic optics cube replaces a fluorescence filter cube in a microscope.

4. The diagnostic optics cube of claim 1 wherein the mirror comprises a plurality of set screws.

5. The diagnostic optics cube of claim 1 further comprising a plurality of observation axis optical components fastened between the mirror and the second void.

6. The diagnostic optics cube of claim 1 further comprising a plurality of illumination axis optical components fastened between the mirror and the first void.

7. The diagnostic optics cube of claim 5 wherein one or more of the observational axis components are selected from the group comprising, convex lens, concave lens, achromatic lens, pinhole and optical filters, where that selection is determined by the optical configuration of both the illumination and observation axis optics in the microscope body that host the diagnostic cube, with those choices optimized for the expressed purpose of providing a clear focused image of the light source being observed to the image sensor or binocular.

8. The diagnostic optics cube of claim 6 wherein one or more of the illumination axis optical components are selected from the group comprising, convex lens, concave lens, achromatic lens, pinhole and optical filters, where that selection is determined by the optical configuration of both the illumination and observation axis optics in the microscope body that host the diagnostic cube, with those choices optimized for the expressed purpose of providing a clear focused image of the light source being observed to the image sensor or binocular.

9. The diagnostic optics cube of claim 8, wherein the first illumination axis component is a neutral density filter having a reflective outer side and a non-reflective inner side, the neutral density filter aligned to the first void.

10. A fluorescence filter cube modified to contain components that relay a diagnostic image of an epi illumination light source of a microscope, the fluorescence filter cube comprising:
   a) at least six exterior sides and an interior;
   b) a first side defining a first void with the first void containing a first illumination axis optical component comprising optical filters for selectively reducing incident illumination intensity, a lens that contributes to the reduction in the size of the diagnostic image and a pinhole that extends the depth of field of the relayed diagnostic image so all of the components in the epi illumination path of the microscope are included in the diagnostic image;
   when the illumination axis and observation axis share the same light path, a wireless digital camera relays the diagnostic image from the illumination axis components directly to a user;
   c) a second side defining a second void with the second void containing a first observation axis optical component;
   d) when the illumination axis and the observation axis are orthogonal, a mirror fastened within the interior of the fluorescence filter cube fitted on an orthogonal frame positioned to directly relay the modified incident illumination from the illumination axis into the observation axis, through the observation axis components and finally through the second void resulting in a resized focused diagnostic image relayed to the microscope binocular or camera; to the microscope binocular or camera; and
   e) when the illumination axis entering though the first void is reflected into an observation axis exiting though the second void to the microscope binocular or camera, the observation axis contains components comprising a lens for resizing and focusing the diagnostic image and an optional optical filter used to further selectively reduce the illumination intensity to the microscope binocular or camera.

11. The fluorescence filter cube of claim 10 further comprising a plurality of observation axis optical components fastened between the mirror and the second void.

12. The fluorescence filter cube of claim 10 further comprising a plurality of illumination axis optical components fastened between the mirror and the first void.

13. The fluorescence filter cube of claim 11 wherein one or more of the observational axis optical components are selected from the group comprising, convex lens, concave lens, achromatic lens, pinhole and optical filters where that selection is determined by the optical configuration of both the illumination and observation axis optics in the microscope body that host the diagnostic cube, with those choices optimized for the expressed purpose of providing a clear focused image of the light source being observed to the image sensor or binocular.

14. The fluorescence filter cube of claim 12 wherein one or more of the illumination axis optical components are selected from the group comprising, convex lens, concave lens, achromatic lens, pinhole and optical filters, where that selection is determined by the optical configuration of both the illumination and observation axis optics in the microscope body that host the diagnostic cube, with those choices optimized for the expressed purpose of providing a clear focused image of the light source being observed to the image sensor or binocular.

15. The fluorescence filter cube of claim 14 wherein the first illumination axis component is a neutral density filter having a reflective outer side and a non-reflective inner side, the neutral density filter aligned to the first void.

16. A diagnostic optics cube configured such that when an illumination axis and observation axis share the same light path, a wireless digital camera relays the diagnostic image from the illumination axis components directly to a user, the diagnostic optics cube comprising:
   a) at least six external sides and an interior;
   b) a first exterior side defining a first void with the first void containing illumination axis optical components comprising optical filters for selectively reducing incident illumination intensity, a lens that contributes to the reduction in the size of the diagnostic image and a pinhole that extends the depth of field of the relayed diagnostic image so all of the components in the epi illumination path of the microscope are included in the diagnostic image
   c) the interior containing a wireless digital camera orientated to monitor microscope epi illumination; and,
   d) an illumination axis entering though the first void.

17. The diagnostic optics cube of claim 16 wherein the diagnostic optics cube replaces a beamsplitter in a microscope.

18. The diagnostic optics cube of claim 16 wherein the diagnostic optics cube replaces a fluorescence filter cube in a microscope.

19. The diagnostic optics cube of claim 16 further comprising a plurality of illumination axis optical components fastened between the ccd and the first void.

20. The diagnostic optics cube of claim 19 wherein the one or more of the illumination axis optical components are selected from the group comprising: convex lens, concave lens, achromatic lens, pinhole and optical filters, where that selection is determined by the optical configuration of the illumination axis optics in the microscope body that host the diagnostic cube, with those choices optimized for the expressed purpose of providing a clear focused image of the light source being observed.

* * * * *